United States Patent [19]

Lavens et al.

[11] Patent Number: 4,673,414
[45] Date of Patent: Jun. 16, 1987

[54] RE-SINTERED BORON-RICH POLYCRYSTALLINE CUBIC BORON NITRIDE AND METHOD FOR MAKING SAME

[75] Inventors: Thomas R. Lavens, Sunbury; Francis R. Corrigan, Westerville; Richard L. Shott, Columbus; Harold P. Bovenkerk, Worthington, all of Ohio

[73] Assignee: General Electric Company, Worthington, Ohio

[21] Appl. No.: 823,893

[22] Filed: Jan. 29, 1986

[51] Int. Cl.⁴ .............................................. B24D 3/00
[52] U.S. Cl. ........................................ 51/293; 51/307
[58] Field of Search .................................. 51/293, 307

[56] References Cited

U.S. PATENT DOCUMENTS

| | | | |
|---|---|---|---|
| 2,947,617 | 8/1960 | Wentry, Jr. .............................. | 51/307 |
| 3,233,988 | 2/1966 | Wentry, Jr. et al. ..................... | 51/307 |
| 3,767,371 | 10/1973 | Wentry, Jr. et al. ..................... | 51/307 |
| 3,876,751 | 4/1975 | Alexeevsky et al. ................... | 51/307 |
| 3,918,219 | 11/1975 | Wentry, Jr. et al. ..................... | 51/307 |
| 3,918,931 | 11/1975 | DeVries et al. ....................... | 51/307 |
| 4,188,194 | 2/1980 | Corrigan ................................ | 51/307 |
| 4,289,503 | 9/1981 | Corrigan ................................ | 51/307 |

Primary Examiner—Paul Lieberman
Assistant Examiner—Willie J. Thompson
Attorney, Agent, or Firm—Robert R. Schroeder

[57] ABSTRACT

Disclosed is a method for making re-sintered polycrystalline CBN compact which comprises placing sintered boron-rich polycrystalline CBN particles in a high temperature/high pressure apparatus and subjecting said boron-rich CBN particles to a pressure and a temperature adequate to re-sinter said particles, the temperature being below the reconversion temperature of CBN, for a time sufficient to re-sinter the polycrystalline CBN particles therein. The boron-rich polycrystalline CBN particles in the HP/HT apparatus contain no impurity which would interfere with the sintering process (CBN sintering inhibiting impurities) and no sintering aid material.

14 Claims, 4 Drawing Figures

RE-SINTERED BORON-RICH POLYCRYSTALLINE CUBIC BORON NITRIDE AND METHOD FOR MAKING SAME

BACKGROUND OF THE INVENTION

The present invention relates to a process for making polycrystalline cubic boron nitride (CBN). The manufacture of CBN by a high pressure/high temperature technique is known in the art and is typified by the process described in U.S. Pat. No. 2,947,617 of Wentorf, a basic monocrystalline CBN case. U.S. Pat. No. 4,188,194 describes a process for making sintered polycrystalline CBN compacts which utilizes pyrolytic hexagonal boron nitride (PBN) in the absence of any catalyst. A compact is a mass of abrasive particles bonded together in a self-bonded relationship (see U.S. Pat. Nos. 3,852,078 and 3,876,751); by means of a bonding medium (see U.S. Pat. Nos. 3,136,615, 3,233,988, 3,743,489, 3,767,371, and 3,918,931); or by means of combinations thereof. U.S. Pat. No. 3,918,219 teaches the catalytic conversion of hexagonal boron nitride (HBN) to CBN in contact with a carbide mass to form a composite body. A CBN compact is comprised of a plurality of CBN crystals suitably bonded together to form a large, integral, tough, coherent, high-strength mass. Compacts may be used in applications such as, for example, machining, dressing, and drilling (see U.S. Pat. Nos. 3,136,615 and 3,233,988).

Boron-rich polycrystalline CBN as used in the subject invention can be prepared by high pressure/high temperature processing of mixtures of HBN powder and either elemental boron or various boron containing compounds (e.g. $AlB_{12}$), as described in British Pat. No. 1,513,990; or using vacuum-fired HBN powder to produce excess surface elemental boron which then is converted to CBN as described in U.S. Pat. No. 4,289,503. In these processes, the large chunks of polycrystalline CBN which are produced typically are milled to a size suitable for use in various grinding or other applications. In the milling process, a portion of the material normally is crushed too fine or has an undesirable shape for use in grinding applications and, thus, some use for such unwanted material is desirable. Also, current commercial polycrystalline CBN compacts could be improved by increased edge strength and decreased brittleness (lack of impact strength). An improved polycrystalline CBN product is desired.

BROAD STATEMENT OF THE INVENTION

The present invention provides improved sintered boron-rich polycrystalline CBN compacts of improved edge strength and impact strength. It also provides a method for utilization of the milling by-products obtained when milling boron-rich polycrystalline CBN. The method for making the sintered polycrystalline CBN compact comprises placing sintered boron-rich polycrystalline CBN particles in a high temperature/high pressure apparatus and subjecting said boron-rich CBN particles to a pressure and a temperature adequate to re-sinter the CBN particles, the temperature being below the reconversion temperature of CBN to HBN, for a time sufficient to re-sinter the polycrystalline CBN particles therein. The combination of pressure and temperature is in the CBN stable region of the phase diagram for boron nitride. The temperature then is reduced sufficiently to inhibit reconversion of CBN to HBN (typically 1000° or less) followed by reduction of the pressure and recovery of the re-sintered polycrystalline CBN compact. The process unexpectedly is conducted in the absence of catalysts. Other material (sintering inhibiting impurities) which might interfere with or inhibit the sintering of boron-rich polycrystalline CBN particles also should be avoided. In addition a support material such as a cemented metal carbide may be placed adjacent the boron-rich CBN particles in the high pressure/high temperature apparatus so as to form in-situ a supported polycrystalline CBN compact. The desired pressure is between about 45 and 80 Kbars and the preferred temperature ranges from about 1500°-2300° C., but below the CBN reconversion temperature. The reconversion (or back conversion) temperature is defined to be that temperature at which boron nitride reconverts from the cubic crystal structure to the hexagonal. This temperature is found along the equilibrium line separating the hexagonal boron nitride stable region from the cubic boron nitride stable region in the phase diagram for boron nitride (see U.S. Pat. No. 3,212,852; FIG. 6 and col. 8, line 66-col. 9, line 42).

Advantages of the present invention include the ability to make exceedingly tough, impact resistant bodies with improved edge strength. Another advantage is the production of such bodies without the addition of sintering aids. A further advantage is the beneficial utilization of a conventional milling by-product to make valuable CBN compacts. These and other advantages will be readily apparent to those skilled in the art based upon the disclosure contained herein.

Figure 1:
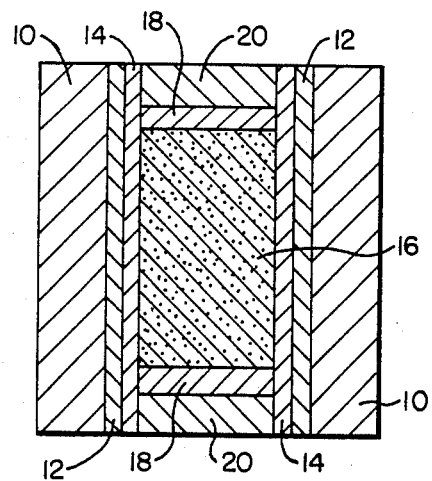
FIGS. 1–4 illustrate, in cross-section, various configurations for reaction zone assemblies (or cells) for use within a high pressure/high temperature apparatus such as those described in U.S. Pat. Nos. 2,947,611, 2,941,241 and 2,941,248.

The drawings will be described in detail below.

DETAILED DESCRIPTION OF THE INVENTION

The boron-rich polycrystalline CBN particles used in making the sintered polycrystalline CBN compact of the present invention may be made by any suitable technique known in the art. One technique for preparation of the boron-rich polycrystalline CBN involves the high pressure/high temperature processing of mixtures of hexagonal boron nitride (HBN) powder and either elemental boron or various boron containing compounds (e.g. $AlB_{12}$) as described in British Pat. No. 1,513,990. Another process for making the boron-rich polycrystalline CBN involves generating excess boron on the surfaces of oxide-free HBN prior to its conversion to cubic boron nitride. The excess boron is generated by a pre-treatment which is carried out at a temperature in the hexagonal boron nitride thermal decomposition range by vacuum firing and heating under an inert atmosphere followed by conversion to CBN by high pressure/high temperature processing as described in U.S. Pat. No. 4,289,503. Regardless of the process employed, boron-rich polycrystalline CBN generally is produced in large chunks which typically are milled to particle sizes more suitable for use in various grinding or other applications. A distinct advantage of the present invention is the ability to advantageously utilize the milling by-product resulting from such size milling operations. While the sintered polycrystalline CBN compact of the present invention may utilize advantageously such milling by-products or fines, the process also operates quite effectively on larger sized boron-rich CBN particles ranging in size up to 250 microns (60 mesh) or greater. In this regard, the size of the boron-rich polycrystalline CBN particles may be the same as the size of conventional CBN particles being subjected to a high pressure/high temperature operation for formation of conventional polycrystalline compacts, such as described in U.S. Pat. No. 3,767,371.

Another advantage of the present invention is the ability to beneficially utilize the CBN produced, for example, by the process of U.S. Pat. No. 4,289,503 which is microcrystalline in nature. The use of any size particles of this microcrystalline CBN to make CBN compacts results in a finer microstructure of the CBN compact with improved toughness over coarser grained compacts. Such fine grained structures are difficult to manufacture by conventional processes. However, the finer microstructure CBN compact of the present invention is easier to make than with conventional processes because fine separate particles of single crystal CBN do not have to be handled separately.

It will be appreciated that boron-rich polycrystalline CBN particles already are "sintered" in their formation so that the process of the present invention may be termed as a "re-sintering" process. Of significant departure from the art is the quite unexpected discovery that the sintered boron-rich polycrystalline CBN particles could be re-sintered for the formation of strong, coherent compacts. Conventional sized crystal cubic boron nitride particles often are formed into sintered polycrystalline compacts utilizing a catalyst such as described in U.S. Pat. No. 2,947,617 or other means for achieving bonding. The present invention, however, results unexpectedly in the formation of superior polycrystalline CBN compacts by re-sintering the boron-rich polycrystalline CBN particles without the aid of a catalyst at temperature and pressure conditions of the order typically employed in processes which utilize a catalyst.

In practicing the present invention, the boron-rich CBN particles are placed in a high pressure/high temperature apparatus such as described in U.S. Pat. No. 4,289,503 and placed under pressure and then temperature for a time sufficient for re-sintering to occur. The sample then is allowed to cool under pressure as known in the art to inhibit reconversion or back conversion of CBN to HBN and finally the pressure is decreased to atmospheric pressure, and the mass of re-sintered polycrystalline CBN recovered. The reaction zone assemblies or cells of FIGS. 1-4 have been used in the making of sintered polycrystalline CBN compacts in accordance with teachings of the present invention. The reaction zone assemblies or cells of the drawings include pyrophyllite cylinder bushing 10 which alternatively may be made of glass, soft ceramic, talc, alkali halide, steatite or forms of soapstones. Positioned concentrically within and adjacent bushing 10 is graphite resistance heater tube 12. Metal foil wrap 30 (FIGS. 2-4) may be inserted optionally between bushing 10 and graphite tube 12 as a contamination shield. The shield metal is a refractory metal which may be selected from the group consisting of zirconium, titanium, tantalum, tungsten, and molybdenum.

Concentric refractory metal tube 14 (FIG. 1) is retained within graphite tube 12 and may be formed from the refractory metal listed above. Intact cylinders more commonly are obtained with the graphite tube-lined cell assemblies (FIGS. 2-4) whereas fractured and broken samples are obtained with the refractory metal, e.g. titanium, tube construction shown in FIG. 1. The assemblies in FIGS. 1 and 2 have sample 16 of boron-rich polycrystalline CBN particles placed within the cylindrical housing assemblage with the ends containing graphite plugs 18 adjacent sample 16 with pressure-transmitting plugs placed outside of graphite plugs 18. Hot pressed hexagonal boron nitride plugs may be used as plugs 20 in conventional fashion.

Figure 3:
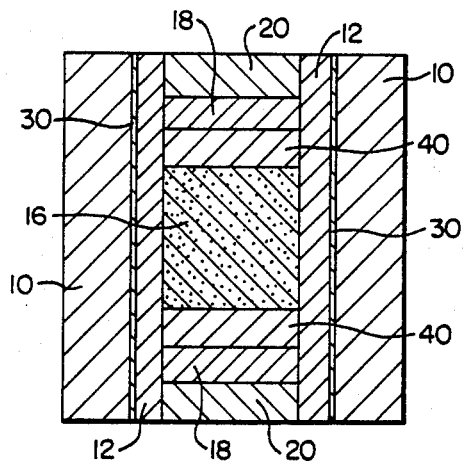
Figure 4:
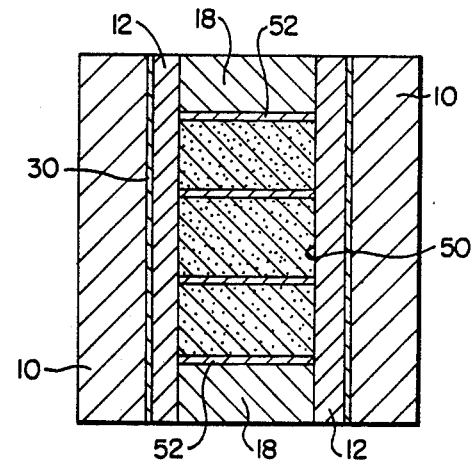

In FIG. 3, graphite plugs 40 are placed adjacent the sample and between sample 16 and graphite plugs 18. In FIG. 4, a plurality of samples may be made in a single cell assembly having graphite disk 52 placed between the samples. Additional embodiments of the reaction cell may find utility and certainly are included within the scope of the present invention. Further details on high pressure/high temperature reaction cells may be found in U.S. Pat. Nos. 3,767,371, 4,188,194, and 4,289,503.

Preferably, the boron-rich polycrystalline CBN particles placed within the reaction cell should contain no catalyst material nor any other material which is a contaminant or which hinders the CBN sintering process, i.e. no CBN sintering inhibiting impurities. Besides the boron-rich polycrystalline CBN particles, additional boron containing compounds (e.g. $AlB_{12}$) or the like may be included as a source of boron in the cell, for example as taught in British Pat. No. 1,513,990, cited above. In any event, the sample is subjected to a pressure in excess of about 45 Kbars and generally such pressure should range from between about 45 and 80 Kbars. The temperature should be at least about 1500° C., but should be less than the CBN reconversion temperature. Preferably, the temperature should range from about 1500° and 2300° C. The time necessary for the re-sintering to occur necessarily depends upon the temperature and pressure combination chosen as is well known in the art. The Examples will elaborate further on the reaction conditions under which the novel re-sintered polycrystalline CBN compact is made.

It should be understood that the preferred temperatures and pressures specified herein are estimates only in accordance with the high-pressure art which recognizes such variances due to the difficulty in precisely measuring the high pressures and temperatures encountered in this field. Of importance in the process of the present innvention is that conditions of pressure and temperature adequate for CBN sintering (and inadequate for CBN reconversion) are maintained for a time adequate for CBN re-sintering to occur.

The re-sintered polycrystalline CBN compact may be subjected to milling or size attrition for the production of unusually tough and useful CBN particles which may be used in making resin bonded grinding wheels, metal bonded grinding wheels, metal bonded saw elements, and like conventional cutting and abrading tools. Additionally, intact polycrystalline compacts may be cleaned to remove any adhering carbon, titanium, or other material. After cleaning, the samples can be milled to sizes required for grinding applications or the disk and cylinder shaped pieces may be shaped for cutting tool applications. In this regard, the compacts may be used in unsupported or in conventional supported form utilizing a tungsten carbide or other support. While adherence of the polycrystalline CBN compact to the support may be achieved in situ by placing the support material adjacent the boron rich CBN particles prior to formation of the compact in the high pressure/high temperature cell, the joining may also be achieved via brazing or other technique after formation of the sintered polycrystalline CBN compact.

The following Examples show how the invention may be practiced but should not be construed as limiting in any way. In this application, all percentages and proportions are by weight and all units are in the metric system, unless otherwise expressly indicated. Also, all citations referred to herein are incorporated expressly by reference.

EXAMPLES

EXAMPLE 1

Finer than 170 mesh (88 microns) powder was obtained by milling boron-rich polycrystalline CBN prepared in accordance with U.S. Pat. No. 4,289,503. Each re-sintering run utilized 5 gram samples of the milled powder which had been cleaned in accordance with the cleaning procedures in U.S. Pat. No. 4,289,503 and which then was placed in a reaction cell of the configuration depicted in FIG. 2. This cleaning procedure was used with the CBN material in all of the examples. The sintering conditions included a pressure estimated at 67 Kbar and about 2,000° C. for eight minutes. The sintered masses were recovered from the reaction cells, cleaned in hot 10% nitric/90% sulfuric acid to remove any adhering graphite and milled to a particle size of less than 60 mesh (250 microns). After milling, the 60/80 mesh size fraction (88-250 microns) was cleaned in an ultrasonic water bath, rinsed in acetone, air-dried, and coated with 60% by weight of a nickel phosphate coating for use in wheel tests for the dry grinding of M-4 hardened tool steel.

Phenolic resin bonded grinding wheels were prepared to contain 75 weight percent (38.6 volume percent) of the re-sintered CBN abrasive. The grinding wheels were standard 11V9 test wheels, 9.525 cm×3.81 cm×3.175 cm (3.75 in.×1.5 in.×1.25 in.), with a 0.3175 cm (0.125 in.) wide abrasive rim. The wheels were mounted on the grinder and trued using a truing brake and silicon carbide wheel until 0.2-0.3 mm (0.008-0.012 in) of wheel was removed. The wheel was dressed open then with a 220 grit, "G" hardness aluminum oxide stick. Data collected included the volume of wheel consumed, volume of material removed, power and surface finish. The grinding ratio was calculated for each test condition in conventional fashion. The dry grinding tests were conducted under the following conditions:

| | |
|---|---|
| Wheel Speed: | 20 meters/second(4,000 SPFM) |
| Table Speed: | 2.44 meters/minute(8 FPM) |
| Material: | M-2, Rc 60-62 |
| | 6.4 mm (0.250 inches) × 203 mm (8 inches) 8 pieces |
| Infeed: | 0.050 mm (0.002 inches) |
| Material Removal Rate: | 0.79 cm$^3$/minutes(0.048 inches$^3$/minutes) |

Beside the novel re-sintered CBN abrasive of the present invention, comparative tests were utilized with boron-rich polycrystalline CBN powder as prepared in accordance with U.S. Pat. No. 4,289,503 and with a conventional commercially-available cubic boron nitride abrasive grain. The following data was recorded:

TABLE 1

| Test No. | CBN-type | No. Wheels/ Test | Grinding[1] Ratio | Grinding[2] Energy |
|---|---|---|---|---|
| 26052 | Novel Resiniered | 3 | 127 | 14.6 |
| 26053 | Novel Resintered | 4 | 112 | 18.3 |
| 26050 | U.S. Pat. No. 4,289,503 | 4 | 120 | 13.2 |
| 26051 | U.S. Pat. No. 4,289,503 | 5 | 101 | 15.9 |
| 26054 | Conventional | 5 | 78 | 14.4 |
| 26055 | Conventional | 4 | 80 | 14.3 |

[1]Grinding Ratio is $\frac{\text{volume of material removed}}{\text{volume of wheel consumed}}$
[2]Grinding energy is watt-hour/cm$^3$ of material removed Based upon above-tabulated data, the following relative grinding ratios were calculated based upon a grinding ratio of 1.0 for the Conventional CBN grinding wheels.

TABLE 2

| RELATIVE GRINDING RATIOS | |
|---|---|
| CBN-Type | Relative GR |
| Conventional | 1.00 |
| U.S. Pat. No. 4,289,503 | 1.39 |
| Novel Resintered | 1.51 |

Thus, it will be seen that the novel re-sintered CBN abrasive of the present invention unexpectedly, though quite convincingly, provides much improved grinding performance compared to the boron-rich CBN from which it was made (U.S. Pat. No. 4,289,503) and compared to conventional commercial CBN powder. Thus, the novel re-sintered CBN powder of the present invention possesses the ability to realize improved grinding ratios compared to CBN abrasive that has heretofore been available.

EXAMPLE 2

A series of high pressure/high temperature sintering tests were conducted on finer than 270 mesh (53 microns) boron-rich polycrystalline CBN aggregate material at various pressure and temperature conditions. The CBN material was obtained by repeated crushing of boron-rich polycrystalline CBN aggregate chunks prepared as described in U.S. Pat. No. 4,289,503. The sample contained particles ranging in size from 270 mesh (53 microns) to dust.

Each test was conducted using 7 gram loads of the powdered CBN in a high pressure cell having the configuration depicted in FIG. 1. The cells were loaded by first inserting the graphite and hot-pressed boron nitride disk shaped plugs in one end of the titanium tube. The sample powder then was poured into the tube and capped with graphite and hot pressed boron nitride plugs. After assembly, the cells were placed in a high pressure belt apparatus and the pressure increased to the level shown in Table 3. After reaching the desired pressure, each sample was heated by passing electrical current through the cell in conventional fashion. After heating, the sample was allowed to cool at pressure for one minute before the pressure was reduced.

The total heating time in each case was 7 minutes. No direct pressure or temperature calibration was conducted for this series of runs, thus the pressure and temperatures set forth below are estimates.

TABLE 3

| Run No. | Pressure (Kbar) | Temperature (°C.) |
| --- | --- | --- |
| 1 | 72 | 2050 |
| 2 | 72 | 2000 |
| 3 | 72 | 1925 |
| 4 | 69 | 2000 |
| 5 | 68 | 2000 |
| 6 | 67 | 2000 |
| 7 | 62 | 1800 |
| 8 | 62 | 1700 |
| 9 | 62 | 1200 |

In Runs 1-8, the samples were recovered in the form of predominantly large black sintered pieces ranging in size up to 0.6 cm (0.25 in.) thick by about 1.3 cm (about 0.5 in.) diameter disk. Each of the recovered re-sintered samples of Runs 1-8 would readily scratch conventional CBN polycrystalline compacts. The disk recovered from Run 9, however, was noticeably lighter in color and failed to scratch the polycrystalline CBN compacts. It is postulated that the temperature utilized in Run 9 was too low to effect a level of re-sintering desirable for many commercial applications.

EXAMPLE 3

In these runs, one gram samples of the same boron-rich CBN powder used in Example 2 were pressed in cells having a configuration as in FIG. 3. A total heating time of 7 minutes was used along with the estimated pressure and temperature conditions set forth below.

TABLE 4

| Run No. | Pressure (Kbar) | Temperature (°C.) |
| --- | --- | --- |
| 10 | 58 | 2000 |
| 11 | 58 | 1775 |
| 12 | 58 | 1600 |
| 13 | 58 | 1450 |
| 14 | 58 | 1275 |

In all of the above runs, large unitary pieces, referred to as compacts, were obtained. The compacts from Runs 10-12 would scratch conventional polycrystalline CBN compacts, while the compacts recovered from Runs 13 and 14 would not. Using the scratching ability of the re-sintered compacts against conventional polycrystalline CBN compacts as a desirable sintering criteria benchmark, the above-tabulated results indicate that well-sintered masses are obtained at combined pressures down to at least 58 Kbar and at estimated temperatures of 1600° C. and higher (up to the CBN reconversion temperature).

EXAMPLE 4

Figure 2:
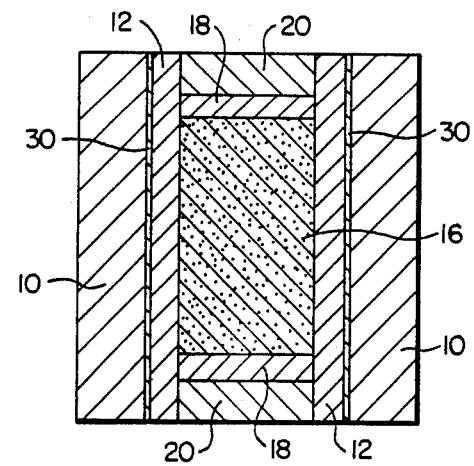

Seven grams of the same boron-rich CBN powder as used in the above examples was loaded in a cell having a configuration of FIG. 2 and pressed at about 67 Kbar and 1800° C. for ten minutes. A sintered unitary cylindrical-shaped mass 0.6 inches (1.524 cm) long by 0.52-0.54 inch (1.32-1.37 cm) diameter was obtained. This sample could not be broken by repeated blows with a steel hammer.

EXAMPLE 5

Additional polycrystalline CBN compacts were made in multiple sample cells at press conditions varying over the range of about 59 Kbar to about 45 Kbar and about 1500° to 1900° C. for five minutes. The cell construction for these additional runs was similar to the cell configuration of FIG. 2 except that the two-piece graphite plug (18)/hot pressed BN end plugs (20) were replaced by a single graphite plug. Additionally, discs (0.381 mm or 0.15 in.) of graphite were placed between the samples and the graphite end plugs. The cells were loaded with either two or three individual 2 gram samples separated by the oriented graphite disk. The sample boron-rich polycrystalline CBN material used for re-sintering into compact form was −270 mesh (−53 microns) tailings which had been generated by milling boron-rich polycrystalline CBN compacts made in accordance with U.S. Pat. No. 4,289,503. The sample material had been acid cleaned (HNO$_3$/HF) to remove metallic and stone impurities prior to placement within the cell.

Some of the sample material placed in the cells were mixed with 10% by weight AlB$_{12}$ powder and with 25% by weight vacuum-fired HBN powder. A number of the compacts made were surface ground flat and cylindrically ground to 1.27 cm (0.5 in.) diameter disk for abrasive resistance testing. These compacts were chosen for evaluating the AlB$_{12}$ additive because the re-sintering conditions (pressure and temperature) for them were about the same as the re-sintering conditions used where no additive was present. The abrasive resistance test consisted of turning a silica-filled hard rubber workpiece for a set time period. The relative performance of the compacts to abrasive wear was determined from the amount of wear experienced by each individual compact. From the measured compact wear, an abrasive resistance factor (ARF factor) was calculated according to the following equation:

$$ARF = t/100 \times W$$

where:
t = test time (minutes)
W = compact or tool wear (inches).
The following results were obtained:

TABLE 5

| Sample No. | Compact Wear (mils) | ARF | Additive | Pressure (Kbar) | Temp. (°C.) |
| --- | --- | --- | --- | --- | --- |
| Commercial CBN Compact | 13 | 12.3 | — | — | — |
| 4 | 14 | 11.4 | 10% AlB$_{12}$ | 56 | 1700 |
| 2 | 11 | 14.5 | 10% AlB$_{12}$ | 60 | 1700 |
| 3B | 10 | 18.0 | None | 60 | 1700 |
| 3A | 9 | 17.7 | None | 60 | 1700 |

The above-tabulated results indicate that superior abrasive resistance performance was observed compared to a commercial tungsten carbide supported CBN compact with the re-sintered compacts (Samples Nos. 3A and 3B). Superior abrasive resistance performance also was observed by Sample #2 which contained additive AlB$_{12}$.

Additional compact samples were utilized in turning a hardened steel workpiece (type D2 steel). This set of tests used 0.95 cm (0.375 in.) square compact inserts. The hardened steel workpiece was turned or cut by each sample until 0.381 mm (0.015 in.) wear of the compact was measured. The time in minutes to reach the indicated wear distance was recorded as follows.

TABLE 6

| Sample No. | Tool Life (min.) | Additive | Pressure (Kbar) | Temp. (°C.) |
|---|---|---|---|---|
| Commercial CBN Compact | 10.4 | — | — | — |
| 4 | 11.2 | 10% AlB$_{12}$ | 56 | 1700 |
| 2 | 12.9 | 10% AlB$_{12}$ | 60 | 1700 |
| 3A | 18.9 | None | 60 | 1700 |
| 10 | 20.7 | None | 54 | 1700 |

These results indicate improved performance of the re-sintered boron-rich polycrystalline CBN compacts again in the grinding of hardened steel workpieces. Improved performance additionally was observed when AlB$_{12}$ additive was included in the sample powder pressed to make the compacts of the present invention.

EXAMPLE 6

A number of re-sintered boron-rich polycrystalline CBN compacts were made in the cell as configured in FIG. 4 (some samples with and some without optional tantalum foil wrap 30). Sample amounts were 3 grams each and multiple 2 or 3 sample loads (2.8 grams and 2.0 grams samples, respectively) were used at various press conditions set forth below (about 5 minutes at the indicated pressure and temperature).

The compacts made were ground flat to an outside diameter of 0.88 cm (0.347 in.) for abrasive resistance testing. The ARF factor was calculated in accordance with the formula described in Example 6. The following results were recorded. The temperatures were estimated but are thought to be reasonably accurate.

TABLE 7

| Sample No. | Pressing Conditions Pressure (Kbar) | Temp. (°C.) | Compact Wear (mils) | ARF |
|---|---|---|---|---|
| Commercial CBN Compact | — | — | 13.0 | 12.3 |
| 5 | 45 | 1500 | 9.5 | 16.8 |
| 6 | 45 | 1500 | 9.5 | 16.8 |
| 1 | 60 | 1800 | 9.0 | 17.7 |
| 2(End Compact) | 60 | 1800 | 9.0 | 17.7 |
| 2(Center Compact) | 60 | 1800 | 9.0 | 17.7 |
| 3 | 52 | 1500 | 9.0 | 17.7 |
| 4 | 49 | 1700 | 8.5 | 18.7 |

The above-tabulated results again demonstrate the improved abrasive resistance performance which is obtained utilizing the novel re-sintered boron-rich polycrystalline CBN compacts of the present invention. Such improved abrasive resistance performance was observed over a broad range of pressing conditions as reported above.

EXAMPLE 7

A series of high pressure sintering runs were made on samples in which cemented tungsten carbide discs were placed adjacent to the boron rich polycrystalline CBN powder in the high pressure cells. Re-sintering conditions were estimated to comprise a pressure of about 50–60 Kbar and a temperature of about 1500° C. A number of intact samples were obtained with the sintered boron nitride layer in situ bonded to the tungsten carbide disc. One such sample was ground flat and OD ground to 0.347 in. diameter for abrasive resistance testing. The boron rich polycrystalline CBN powder used in preparing was the same as that used in Example 5. The sample was abrasion resistance tested as described in Example 5 giving an abrasive resistance factor of 15.0 compared to an abrasion resistance factor of 12.3 for the commercial WC supported CBN compacts tested in Examples 5 and 6.

What we claim is:

1. A method for making re-sintered polycrystalline cubic boron nitride (CBN) which comprises:
   (a) placing sintered substantially catalyst-free boron-rich polycrystalline cubic boron nitride particles in a high pressure/high temperature apparatus, said particles being substantially free of sintering inhibiting impurities;
   (b) subjecting said boron-rich cubic boron nitride particles to a pressure and a temperature adequate to re-sinter said particles, the temperature being below the CBN reconversion temperature;
   (c) maintaining said temperature and pressure for a time sufficient to re-sinter the boron-rich cubic boron nitride particles in said apparatus; and
   (d) recovering said re-sintered polycrystalline cubic boron nitride from said apparatus.

2. The method of claim 1 wherein said pressure is in excess of about 45 Kbars and said temperature ranges from at least about 1500° C. to below the CBN reconversion temperature.

3. The method of claim 1 wherein said pressure ranges from between about 45 to about 80 Kbars.

4. The method of claim 1 wherein the temperature ranges from about 1500° C. to about 2300° C.

5. The method of claim 1 wherein the pressure ranges from about 45 Kbars to about 80 Kbars and the temperature ranges from about 1500° C. to about 2300° C.

6. The method of claim 4 wherein the pressure ranges from about 45 to 80 Kbars.

7. The method of claim 3 wherein said boron-rich cubic boron nitride contains an additional boron-containing compound.

8. The method of claim 1 wherein said cubic boron nitride placed in said apparatus ranges in particle size up to less than 270 mesh.

9. The method of claim 1 wherein a re-sintered polycrystalline cubic boron nitride compact is recovered from said apparatus.

10. The method of claim 6 wherein a plurality of re-sintered compacts are simultaneously made in said apparatus.

11. The method of claim 9 wherein support material is placed adjacent said particles to make a supported compact in situ.

12. The method of claim 1 wherein said sintered cubic boron nitride particles in step (a) result from milling sintered cubic boron nitride.

13. Re-sintered polycrystalline cubic boron nitride obtained by the method of claim 1.

14. Re-sintered polycrystalline cubic boron nitride compact obtained by the method of claim 10.

* * * * *